(12) United States Patent
Oota

(10) Patent No.: US 7,640,556 B2
(45) Date of Patent: Dec. 29, 2009

(54) DISK APPARATUS

(75) Inventor: Hidehiko Oota, Ehime (JP)

(73) Assignee: Panasonic Corporation, Osaka (JP)

( * ) Notice: Subject to any disclaimer, the term of this patent is extended or adjusted under 35 U.S.C. 154(b) by 742 days.

(21) Appl. No.: 10/585,322

(22) PCT Filed: Aug. 9, 2005

(86) PCT No.: PCT/JP2005/014558

§ 371 (c)(1),
(2), (4) Date: Jul. 6, 2006

(87) PCT Pub. No.: WO2006/025197

PCT Pub. Date: Mar. 9, 2006

(65) Prior Publication Data

US 2009/0178065 A1 Jul. 9, 2009

(30) Foreign Application Priority Data

Aug. 31, 2004 (JP) .............................. 2004-252995

(51) Int. Cl.
*G11B 17/04* (2006.01)
(52) U.S. Cl. .................................................. 720/607
(58) Field of Classification Search ................ 720/607, 720/602, 601, 605, 613, 689, 612, 609, 734
See application file for complete search history.

(56) References Cited

U.S. PATENT DOCUMENTS

2009/0178064 A1 * 7/2009 Wada .......................... 720/601

FOREIGN PATENT DOCUMENTS

| JP | 2000-156009 | 6/2000 |
|---|---|---|
| JP | 2002-352498 | 12/2002 |
| JP | 2003-157604 | 5/2003 |

* cited by examiner

*Primary Examiner*—Allen T Cao
(74) *Attorney, Agent, or Firm*—Dickinson Wright PLLC

(57) ABSTRACT

It is an object of the present invention to provide a disk apparatus in which the driving mechanisms for the pulling-in lever and the discharging lever can be accommodated in limited spaces and the disk can be prevented from being damaged when the disk apparatus is abnormally operated.

A base body 10 includes a pulling-in lever 80 which inserts a disk, a discharging lever 100 which discharges the disk, and a slider mechanism which turns the pulling-in lever 80 and the discharging lever 100. The slider mechanism includes a first cam groove in which a first pin of the pulling-in lever 80 slides, and a second cam groove in which a second pin of the discharging lever 100 slides. When the slider mechanism is operated, the first pin slides in the first cam groove, thereby turning the pulling-in lever 80. When the slider mechanism is operated, the second pin slides in the second cam groove, thereby turning the discharging lever 100. The slider mechanism includes a resilient member 44 which expands and contracts in a sliding direction of the slider mechanism, a first movable piece 45 provided on one end of the resilient member 44, and a second movable piece 46 provided on the other end of the resilient member 44. The first pin displaces the first movable piece 45 by a load applied to the pulling-in lever 80 from the disk. The second pin displaces the second movable piece 46 by a load applied to the discharging lever 100 from the disk.

21 Claims, 15 Drawing Sheets

DISK APPARATUS

TECHNICAL FIELD

The present invention relates to a disk apparatus for recording or replaying into or from a disk-like recording medium such as a CD and a DVD, and more particularly, to a so-called slot-in type disk apparatus capable of directly inserting or discharging a disk from or to outside.

BACKGROUND TECHNIQUE

A loading method is widely employed in conventional disk apparatuses. In this method, a disk is placed on a tray or a turntable, and the tray or the turntable is loaded into an apparatus body.

According to such a loading method, however, since the tray or the turntable is required, there is a limit for thinning the disk apparatus body.

As a slot-in type disk apparatus, there is proposed a method in which a conveying roller is abutted against a disk surface to pull the disk in (e.g., a patent document 1).

(Patent document 1) Japanese Patent Application Laid-open No. H7-220353

DISCLOSURE OF THE INVENTION

Problem to be Solved by the Invention

According to the slot-in type as proposed in the patent document 1, however, since a conveying roller which is longer than a diameter of the disk is used, the width of the apparatus must be increased, and the thickness of the apparatus is also increased due to this conveying roller.

Therefore, in the slot-in type disk apparatus, it is difficult to reduce a main body of the disk apparatus in thickness and size.

Further, such a slot-in type disk apparatus requires a pulling-in lever for inserting a disk and a discharging lever for discharging the disk. In order to reduce the disk apparatus in thickness and size, it is necessary to accommodate driving mechanisms for the pulling-in lever and the discharging lever in limited spaces, and it is necessary to prevent the disk from being damaged when the disk apparatus is abnormally operated.

Hence, it is an object of the present invention to provide a disk apparatus in which the driving mechanisms for the pulling-in lever and the discharging lever can be accommodated in limited spaces and the disk can be prevented from being damaged when the disk apparatus is abnormally operated.

Means for Solving Problem

A first aspect of the present invention provides a disk apparatus comprising a chassis outer sheath having a base body and a lid, in which a front surface of the chassis outer sheath is formed with a disk inserting opening into which a disk is directly inserted, a spindle motor and a pickup are held by a traverse provided on the base body, a slider mechanism is disposed on one end of the traverse, the base body is rotatably provided with a pulling-in lever which inserts the disk and with a discharging lever which discharges the disk, the slider mechanism is provided with a first cam groove in which a first pin of the pulling-in lever slides and with a second cam groove in which a second pin of the discharging lever slides, the pulling-in lever is turned by sliding motion of the first pin in the first cam groove as the slider mechanism is operated, and the discharging lever is turned by sliding motion of the second pin in the second cam groove as the slider mechanism is operated, wherein the slider mechanism includes a resilient member which expands and contracts in the sliding direction of the slider mechanism, a first movable piece provided on one end of the resilient member, and a second movable piece provided on the other end of the resilient member, the first movable piece constitutes a portion of the first cam groove, and second movable piece constitutes a portion of the second cam groove.

According to a second aspect of the invention, in the disk apparatus of the first aspect, the first pin displaces the first movable piece by a load applied to the pulling-in lever from the disk, and the second pin displaces the second movable piece by a load applied to the discharging lever from the disk.

A third aspect of the invention provides a disk apparatus in which a base body is provided with a pulling-in lever which inserts a disk, a discharging lever which discharges the disk and a slider mechanism which turns the pulling-in lever and the discharging lever, the slider mechanism is provided with a first cam groove in which a first pin of the pulling-in lever slides and with a second cam groove in which a second pin of the discharging lever slides, the pulling-in lever is turned by sliding motion of the first pin in the first cam groove as the slider mechanism is operated, and the discharging lever is turned by sliding motion of the second pin in the second cam groove as the slider mechanism is operated, wherein the slider mechanism includes a resilient member which expands and contracts in the sliding direction of the slider mechanism, a first movable piece provided on one end of the resilient member, and a second movable piece provided on the other end of the resilient member, the first pin displaces the first movable piece by a load applied to the pulling-in lever from the disk, and the second pin displaces the second movable piece by a load applied to the discharging lever from the disk.

A fourth aspect of the invention provides a disk apparatus in which a base body is provided with a pulling-in lever which inserts a disk and a slider mechanism which turns the pulling-in lever, the slider mechanism is provided with a cam groove in which a pin of the pulling-in lever slides, the pulling-in lever is turned by sliding motion of the pin in the cam groove as the slider mechanism is operated, wherein the slider mechanism includes a resilient member which expands and contracts in the sliding direction of the slider mechanism, and a movable piece provided on one end of the resilient member, the movable piece constitutes a portion of the cam groove, and the pin displaces the movable piece by a load applied to the pulling-in lever from the disk.

A fifth aspect of the invention provides a disk apparatus in which a base body is provided with a discharging lever which discharges a disk and a slider mechanism which turns the discharging lever, the slider mechanism provides with a cam groove in which a pin of the discharging lever slides, the discharging lever is turned by sliding motion of the pin in the cam groove as said slider mechanism is operated, wherein the slider mechanism includes a resilient member which expands and contracts in a sliding direction of the slider mechanism, and a movable piece provided on one end of the resilient member, the movable piece constitutes a portion of the cam groove, and the pin displaces the movable piece by a load applied to the discharging lever from the disk.

According to a sixth aspect of the invention, in the disk apparatus of the second or third aspect, when the first pin displaces the first movable piece, the displacement of the second movable piece is limited by the second pin, and when the second pin displaces the second movable piece, the displacement of the first movable piece is limited by the first pin.

According to a seventh aspect of the invention, in the disk apparatus of any one of the first and third to fifth aspects, the disk apparatus further comprises a stopper mechanism which stops movement of the slider mechanism at a predetermined position by displacement of the first or second movable piece with respect to the slider.

According to an eighth aspect of the invention, in the disk apparatus of the seventh aspect, the slider is provided with a stopper which moves from a standby position to an operation position by displacement of the first movable piece corresponding to the pulling-in lever with respect to the slider, the stopper which moves to the operation position abuts against a stopper receiver which is provided on a predetermined position of a fixing portion, and the slider stops at a predetermined position.

According to a ninth aspect of the invention, in the disk apparatus of the seventh aspect, the slider is provided with a stopper which moves from a standby position to an operation position by displacement of the second movable piece corresponding to the discharging lever with respect to the slider, the stopper which moves to the operation position abuts against a stopper receiver which is provided on a predetermined position of a fixing portion, and the slider stops at a predetermined position.

According to a tenth aspect of the invention, in the disk apparatus of the seventh aspect, the slider stops at a position where the traverse has not yet risen, by displacement of the first movable piece corresponding to the pulling-in lever with respect to the slider.

According to an eleventh aspect of the invention, in the disk apparatus of any one of the first and third to fifth aspects, the resilient member comprises a compression coil spring.

Effect of the Invention

According to the present invention, it is possible to reduce the disk apparatus in thickness and size.

Especially, according to the invention, it is possible to prevent the pulling-in lever from being damaged when a disk is forcibly pulled out in a discharging direction or a load is applied in a direction opposite from the inserting direction at the time of inserting operation of the disk.

According to the invention, it is possible to prevent the discharging lever from being damaged when the disk is forcibly pushed in the inserting direction or when a load is applied in a direction opposite from the discharging direction at the time of discharging operation of the disk.

In the invention, a resilient member is provided at its one end with a first movable piece and at its other end with a second movable piece. With this, it is possible to prevent both the pulling-in lever and discharging lever from being damaged by means of a single resilient member.

In the invention, when a load is applied to the first movable piece, a second pin prevents the second movable piece from being displaced, and when a load is applied to the second movable piece, a first pin prevents the first movable piece from being displaced. Therefore, after an abnormal state is avoided, the disk apparatus can be returned to the normal operating state.

EXPLANATION OF SYMBOLS

Figure 1:
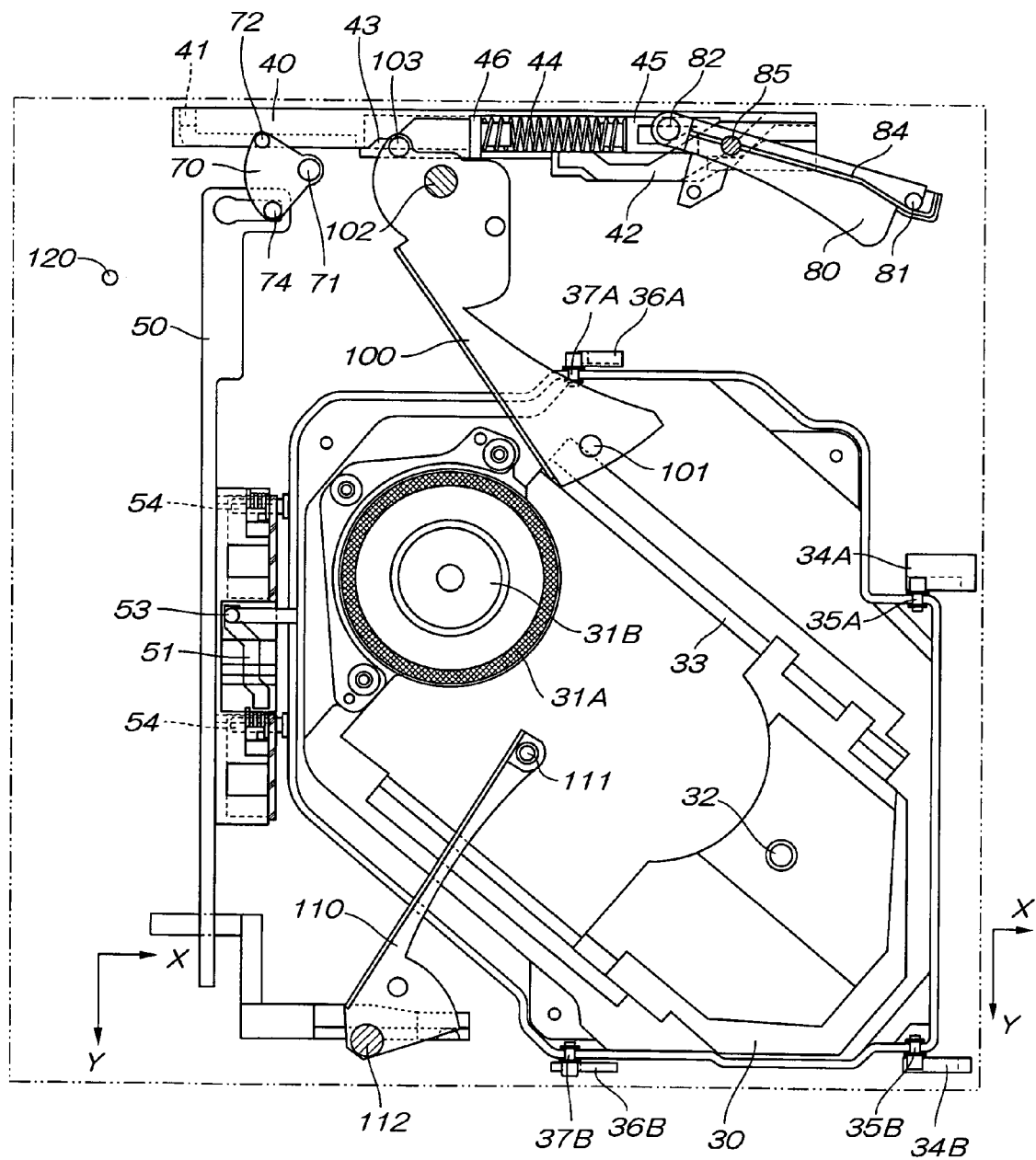
FIG. 1 is a plan view of an essential portion of a base body of a disk apparatus according to an embodiment of the present invention.

10 base body
11 disk inserting opening
30 traverse
31A spindle motor
32 pickup
40 main slider
50 sub-slider
51 slider cam mechanism
52 vertically moving cam mechanism
130 lid

BEST MODE FOR CARRYING OUT THE INVENTION

The first aspect of the present invention provides a disk apparatus, wherein the slider mechanism includes a resilient member which expands and contracts in the sliding direction of the slider mechanism, a first movable piece provided on one end of the resilient member, and a second movable piece provided on the other end of the resilient member, the first movable piece constitutes a portion of the first cam groove, and second movable piece constitutes a portion of the second cam groove. According to this aspect, the resilient member is provided at its one end with the first movable piece and at its other end with the second movable piece. With this, it is possible to prevent the pulling-in lever and the discharging lever from being damaged by means of the single resilient member.

According to the second aspect of the invention, in the disk apparatus of the first aspect, the first pin displaces the first movable piece by a load applied to the pulling-in lever from the disk, and the second pin displaces the second movable piece by a load applied to the discharging lever from the disk. According to this aspect, loads to the pins are released by the displacement of the movable pieces, it is possible to prevent the pulling-in lever and the discharging lever from being damaged.

The third aspect of the invention provides a disk apparatus, wherein the slider mechanism includes a resilient member which expands and contracts in the sliding direction of the slider mechanism, a first movable piece provided on one end of the resilient member, and a second movable piece provided on the other end of the resilient member, the first pin displaces the first movable piece by a load applied to the pulling-in lever from the disk, and the second pin displaces the second movable piece by a load applied to the discharging lever from the disk. According to this aspect, loads to the pins are released by the displacement of the movable pieces, it is possible to prevent the pulling-in lever and the discharging lever from being damaged. The resilient member is provided at its one end with the first movable piece and at its other end with the second movable piece. With this, it is possible to prevent the pulling-in lever and the discharging lever from being damaged by means of the single resilient member.

The fourth aspect of the invention provides a disk apparatus, wherein the slider mechanism includes a resilient member which expands and contracts in the sliding direction of the slider mechanism, and a movable piece provided on one end of the resilient member, the movable piece constitutes a portion of the cam groove, and the pin displaces the movable piece by a load applied to the pulling-in lever from the disk. According to this aspect, when a disk is forcibly pulled out in the discharging direction or when a load is applied in a direction opposite from the inserting direction when the disk is to be inserted, it is possible to prevent the pulling-in lever from being damaged.

The fifth aspect of the invention provides a disk apparatus, wherein the slider mechanism includes a resilient member which expands and contracts in a sliding direction of the slider mechanism, and a movable piece provided on one end of the resilient member, the movable piece constitutes a portion of the cam groove, and the pin displaces the movable piece by a load applied to the discharging lever from the disk. According to this aspect, when a disk is forcibly pushed into the inserting direction or when a load is applied in a direction opposite from the discharging direction when the disk is to be discharged, it is possible to prevent the discharging lever from being damaged.

According to the sixth aspect of the invention, in the disk apparatus of the second or third aspect, when the first pin displaces the first movable piece, the displacement of the second movable piece is limited by the second pin, and when the second pin displaces the second movable piece, the displacement of the first movable piece is limited by the first pin. According to this aspect, after an abnormal state is avoided, the disk apparatus can be returned into a normal operating state.

According to the seventh aspect of the invention, in the disk apparatus of anyone of the first and third to fifth aspects, the disk apparatus further comprises a stopper mechanism which stops movement of the slider mechanism at a predetermined position by displacement of the first or second movable piece with respect to the slider. According to this aspect, motion of the slider mechanism in a state where the disk apparatus remains in its abnormal state can be limited, and it is possible to prevent a further abnormal state from being generated.

According to the eighth aspect of the invention, in the disk apparatus of the seventh aspect, the slider is provided with a stopper which moves from a standby position to an operation position by displacement of the first movable piece corresponding to the pulling-in lever with respect to the slider, the stopper which moves to the operation position abuts against a stopper receiver which is provided on a predetermined position of a fixing portion, and the slider stops at a predetermined position. According to this aspect, motion of the slider mechanism in a state where the disk apparatus remains in its abnormal state can be limited, and it is possible to prevent a further abnormal state from being generated.

According to the ninth aspect of the invention, in the disk apparatus of the seventh aspect, the slider is provided with a stopper which moves from a standby position to an operation position by displacement of the second movable piece corresponding to the discharging lever with respect to the slider, the stopper which moves to the operation position abuts against a stopper receiver which is provided on a predetermined position of a fixing portion, and the slider stops at a predetermined position. According to this aspect, motion of the slider mechanism in a state where the disk apparatus remains in its abnormal state can be limited, and it is possible to prevent a further abnormal state from being generated.

According to the tenth aspect of the invention, in the disk apparatus of the seventh aspect, the slider stops at a position where the traverse has not yet risen, by displacement of the first movable piece corresponding to the pulling-in lever with respect to the slider. According to this aspect, even when a disk is deviated from a predetermined position and a recording surface of the disk is located on a turntable, it is possible to prevent the turntable from coming into contact with the recording surface of the disk.

According to the eleventh aspect of the invention, in the disk apparatus of anyone of the first and third to fifth aspects, the resilient member comprises a compression coil spring. According to this aspect, it is possible to reduce the slider mechanism in size.

PREFERRED EMBODIMENT

A disk apparatus of an embodiment of the present invention will be explained below.

Figure 2:
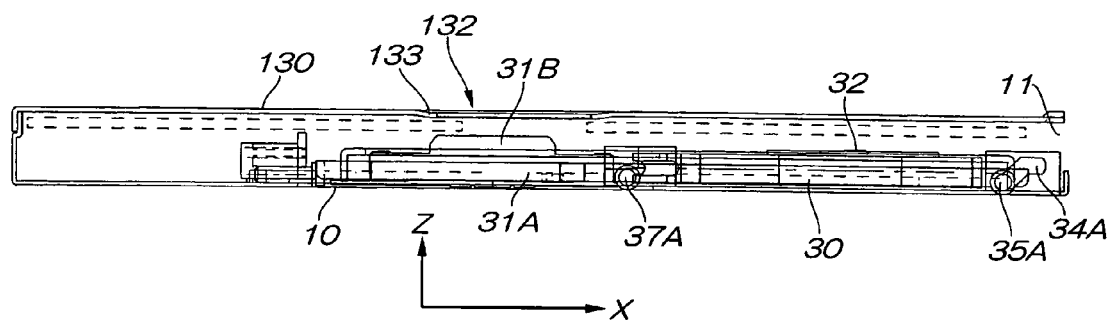
FIG. 2 is a side sectional view of an essential portion of the disk apparatus.
Figure 3:
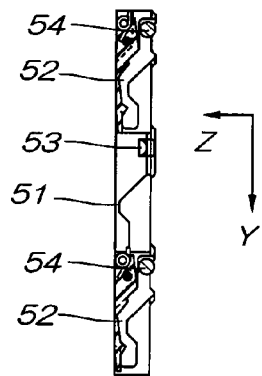
FIG. 3 is a side view of a sub-slider of the disk apparatus.

FIG. 1 is a plan view of an essential portion of a base body of a disk apparatus according to an embodiment of the invention, FIG. 2 is a side sectional view of an essential portion of the disk apparatus, and FIG. 3 is a side view of a sub-slider of the disk apparatus.

The disk apparatus of this embodiment includes a chassis outer sheath comprising a base body and a lid. A bezel is mounted on a front surface of the chassis outer sheath. The disk apparatus of this embodiment is a slot-in type disk apparatus in which a disk is directly inserted from a disk inserting opening formed in the bezel.

A disk inserting opening 11 into which a disk is directly inserted is formed in a front side of a base body 10. A traverse 30 is disposed in the base body 10.

The traverse 30 holds a spindle motor 31A, a pickup 32, and drive means 33 for moving the pickup 32. A rotation shaft of the spindle motor 31A includes a hub 31B for holding a disk. The spindle motor 31A is provided on one end of the traverse 30. The pickup 32 is disposed on the other end of the traverse 30 in a standby state or a chucking state. The pickup 32 can move from one end to the other end of the traverse 30. The drive means 33 includes a drive motor, a pair of rails for allowing the pickup 32 to slide, and a gear mechanism for transmitting a driving force of the drive motor to the pickup 32. The pair of rails are disposed on the opposite sides of the pickup 32 such that the one end and the other end of the traverse 30 are in contact with each other.

In the traverse 30, the spindle motor 31A is located at a central portion of the base body 10, a reciprocating range of the pickup 32 is located closer to the disk inserting opening 11 than the spindle motor 31A, and a reciprocating direction of the pickup 32 is different from an inserting direction of the disk. Here, an angle formed between the reciprocating direction of the pickup 32 and the inserting direction of the disk is 40 to 45°.

The traverse 30 is supported on the base body 10 by a pair of fixing cams 34A and 34B. It is preferable that the pair of fixing cams 34A and 34B are disposed closer to the pickup 32 than the spindle motor 31A and are disposed closer to the disk inserting opening 11 than the standby position of the pickup 32. In this embodiment, the fixing cam 34A is provided at a central portion in the vicinity of an inside of the disk inserting opening 11, and the fixing cam 34B is provided on the one end in the vicinity of the inside of the disk inserting opening 11. The fixing cams 34A and 34B comprise grooves of predetermined lengths extending in the inserting direction of the disk. One end of each of the grooves closer to the one end of the disk inserting opening 11 is separated away from the base body 10 than the other end by a first Z axis distance. Cam pins 35A and 35B provided on the traverse 30 slide in the grooves of the fixing cams 34A and 34B, thereby displacing the traverse 30 in the inserting/discharging direction (X axis direction) of the disk and displacing the traverse 30 in a direction (Z axis direction) in which the traverse 30 is brought close to and away from the base body 10.

A main slider 40 and a sub-slider 50 which move the traverse 30 will be explained next.

The main slider 40 and the sub-slider 50 are disposed on the spindle motor 31A side. One end of the main slider 40 is disposed in a direction of the front surface of a base body 10 and the other end thereof is disposed in a direction of a rear surface of the base body 10. The sub-slider 50 is disposed in a direction intersecting with the main slider 40 at right angles.

A cam mechanism for displacing the traverse 30 comprises a slider cam mechanism 51 and a vertically moving cam mechanism 52. The cam mechanism is provided on the sub-slider 50. The slider cam mechanism 51 comprises a groove of a predetermined length extending in a moving direction of the sub-slider 50. This groove approaches the disk inserting opening 11 (X axis direction) in stages from its one end side (the main slider 40 side) toward the other end. The traverse 30 is provided with a slide pin 53. The slide pin 53 slides in the groove of the slider cam mechanism 51, thereby displacing the traverse 30 in the inserting/discharging direction (X axis direction) of the disk. The vertically moving cam mechanism 52 comprises a groove of a predetermined length extending in the moving direction of the sub-slider 50. A distance (Z axis distance) of the groove is varied in stages from its one end side (the main slider 40 side) toward the other end. The vertically moving pin 54 provided on the traverse 30 slides in the groove of the vertically moving cam mechanism 52, thereby displacing the traverse 30 in a direction (Z axis direction) in which the traverse 30 is brought close to and away from the base body 10.

A loading motor (not shown) is disposed on one end of the main slider 40. A drive shaft of the loading motor and one end of the main slider 40 are connected to each other through a gear mechanism (not shown).

The main slider 40 can slide in a longitudinal direction (X axis direction) by driving the loading motor. The main slider 40 is connected to the sub-slider 50 through a cam lever 70.

The cam lever 70 includes a turning fulcrum 71, the cam lever 70 is engaged with a cam groove 41 provided in the main slider 40 through a pin 72, and the cam lever 70 is engaged with a cam groove provided in the sub-slider 50 through a pin 74.

The cam lever 70 moves the sub-slider 50 in association with movement of the main slider 40, moves the slider cam mechanism 51 and the vertically moving cam mechanism 52 by the movement of the sub-slider 50, and displaces the traverse 30.

The traverse 30 is further supported on the base body 10 by a pair of fixing cams 36A and 36B also. It is preferable that the pair of fixing cams 36A and 36B are disposed between the fixing cams 34A and 34B and the sub-slider 50, and are disposed at intermediate positions between the fixing cams 34A and 34B and the sub-slider 50. The fixing cams 36A and 36B comprise grooves of predetermined lengths which are the same structures as those of the fixing cams 34A and 34B. Cam pins 37A and 37B provided on the traverse 30 slide in the fixing cams 36A and 36B, thereby displacing the traverse 30 in the inserting direction of the disk, and displacing the traverse 30 in a direction in which the traverse 30 is brought close to and away from the base body 10.

The above explained traverse 30, fixing cams 34A, 34B, 36A and 36B, main slider 40, sub-slider 50, and loading motor are provided on the base body 10, and form a disk-inserting space between a lid 130 and these members.

Next, a guide member for supporting a disk and a lever member for operating the disk will be explained.

A first disk guide (not shown) having a predetermined length is provided on one end side of the base body 10 closer to the disk inserting opening 11. The first disk guide has a groove having a U-shaped cross section as viewed from a disk inserting direction. The disk is supported by the groove.

A pulling-in lever 80 is provided on the other end side of the base body 10 closer to the disk inserting opening 11. A movable side end of the pulling-in lever 80 includes a second disk guide 81. The second disk guide 81 comprises a cylindrical roller, and the second disk guide 81 is turnably provided on the movable side end of the pulling-in lever 80. A groove is formed in an outer periphery of the roller of the second disk guide 81, and the disk is supported by this groove.

The pulling-in lever 80 is disposed such that its movable side end is operated on the disk inserting opening 11 side than its fixed side end, and the fixed side end includes a turning fulcrum 82. A third disk guide 84 having a predetermined length is provided between the movable side end and the fixed side end of the pulling-in lever 80. The pulling-in lever 80 includes a pin 85. The pin 85 slides in a cam groove 42 of the main slider 40, thereby operating the pulling-in lever 80. That is, the pulling-in lever 80 is operated such that as the main slider 40 moves, the second disk guide 81 is brought close to and away from the spindle motor 31A.

The base body 10 is provided with a discharging lever 100. A guide 101 is provided on a movable side end of one end of the discharging lever 100. The discharging lever 100 is provided at its other end with a turning fulcrum 102. The discharging lever 100 is operated in association with motion of the main slider 40 by a pin 103 and a cam groove 43.

A discharging lever 110 is provided on the base body 10 on the side opposed to the discharging lever 100. A guide 111 is provided on a movable side end of one end of the discharging lever 110. A turning fulcrum 112 is provided on the other end of the discharging lever 110. The discharging lever 110 moves in the same manner as that of the discharging lever 100.

The base body 10 is provided at its rear side with a fixing pin 120. The fixing pin 120 limits a position of a disk when the disk is loaded or chucked.

The main slider 40 is provided with a resilient member 44 which expands and contracts in a sliding direction of the main slider 40. A coil spring is used as the resilient member 44 for example. The resilient member 44 is provided at its one end with a first movable piece 45 and at its other end with a second movable piece 46. The first movable piece 45 constitutes a portion of the cam groove 42, and is displaced in a direction in which the resilient member 44 is compressed by a load from the pin 85 when abnormal state occurs. The second movable piece 46 constitutes a portion of the cam groove 43, and is displaced in a direction in which the resilient member 44 is compressed by a load from the pin 103 when abnormal state occurs.

As shown in FIG. 2, the chassis outer sheath comprises the base body 10 and a lid 130. The lid 130 is provided at its central portion with an opening 132. The opening 132 is a circular opening having a radius greater than a center hole of the disk. Therefore, the opening 132 is larger than the hub 31B of the spindle motor 31A which is fitted into the center hole of the disk.

The opening 132 is formed at its outer periphery with a narrowed portion 133 projecting toward the base body 10.

The entire inner peripheral surface of the lid 130 is coated with fluorine system compounding urethane beads. Only a contact surface of the narrowed portion 133 of the lid 130 with respect to a disk may be coated. A preferable coating material includes urethane resin compounding beads of 20μ diameter in which 5% fluorine and 1.0 to 1.5% silicon are mixed therein. It is preferable that the coefficient of friction of the coating material is 0.2 to 0.6, and more preferably 0.55 or less.

A motion mechanism of the traverse 30 will be explained using FIGS. 1 to 15.

Positions of the cam mechanism and the pin in FIGS. 1 to 3 show a loading-completed state of a disk.

Figure 4:
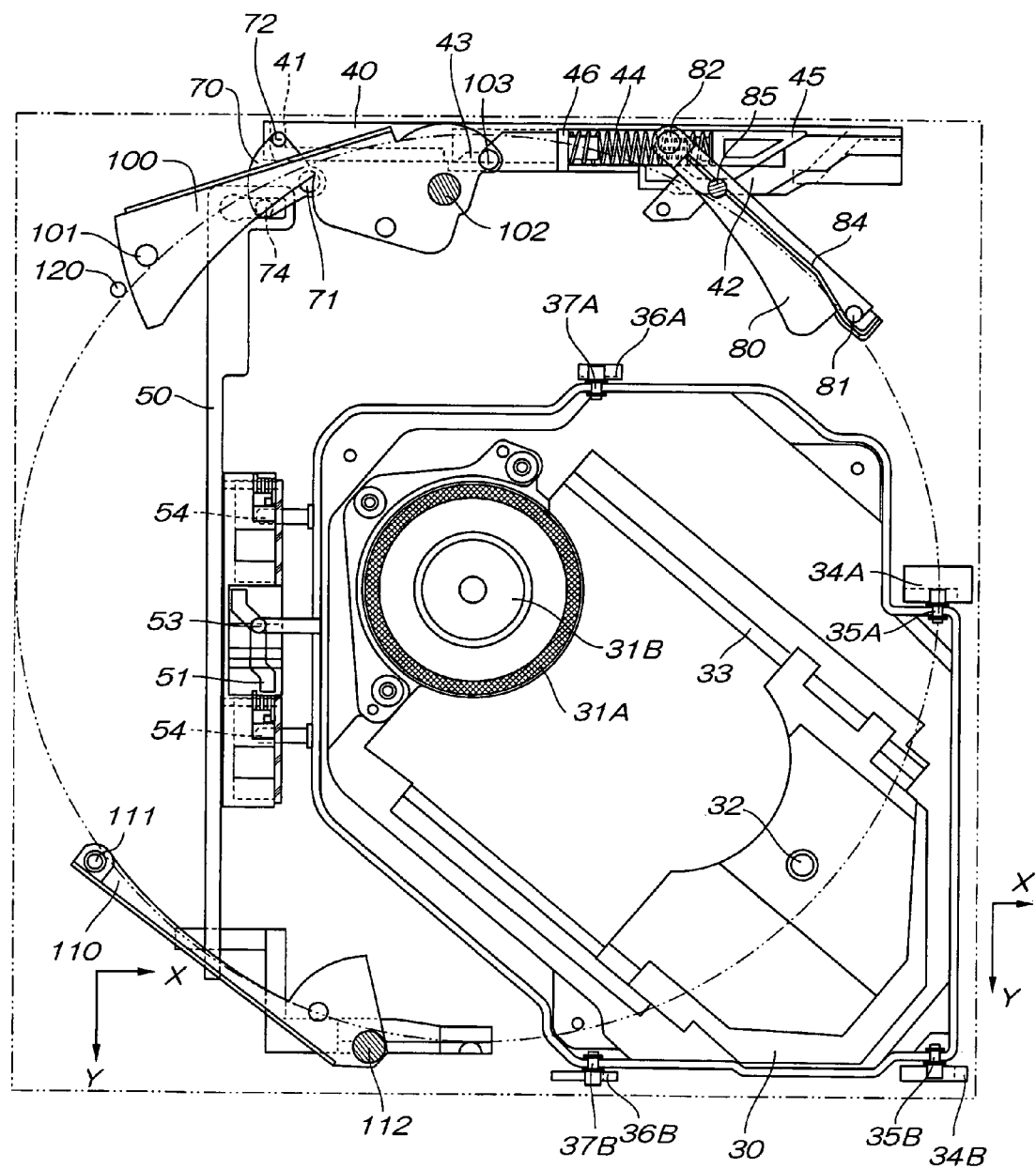
FIG. 4 is a plan view of an essential portion of the base body showing a state where a first predetermined time is elapsed after the chucking motion of a disk of the disk apparatus of the embodiment is started.
Figure 5:
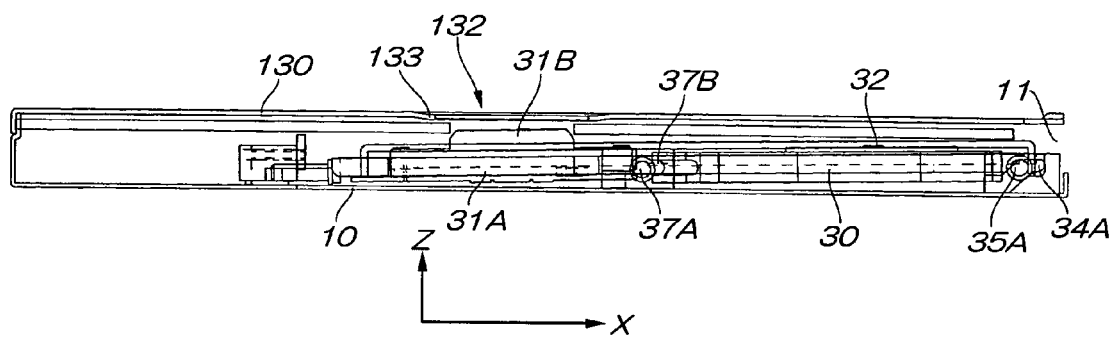
FIG. 5 is a side sectional view of an essential portion of this state.
Figure 6:
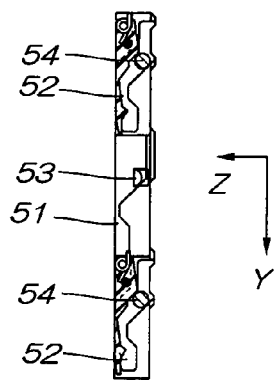
FIG. 6 is a side view of the sub-slider in this state.

FIG. 4 is a plan view of an essential portion of the base body showing a state where a first predetermined time is elapsed after the chucking motion of a disk of the disk apparatus of the embodiment is started, FIG. 5 is a side sectional view of an essential portion in this state, and FIG. 6 is a side view of the sub-slider in this state.

Figure 7:
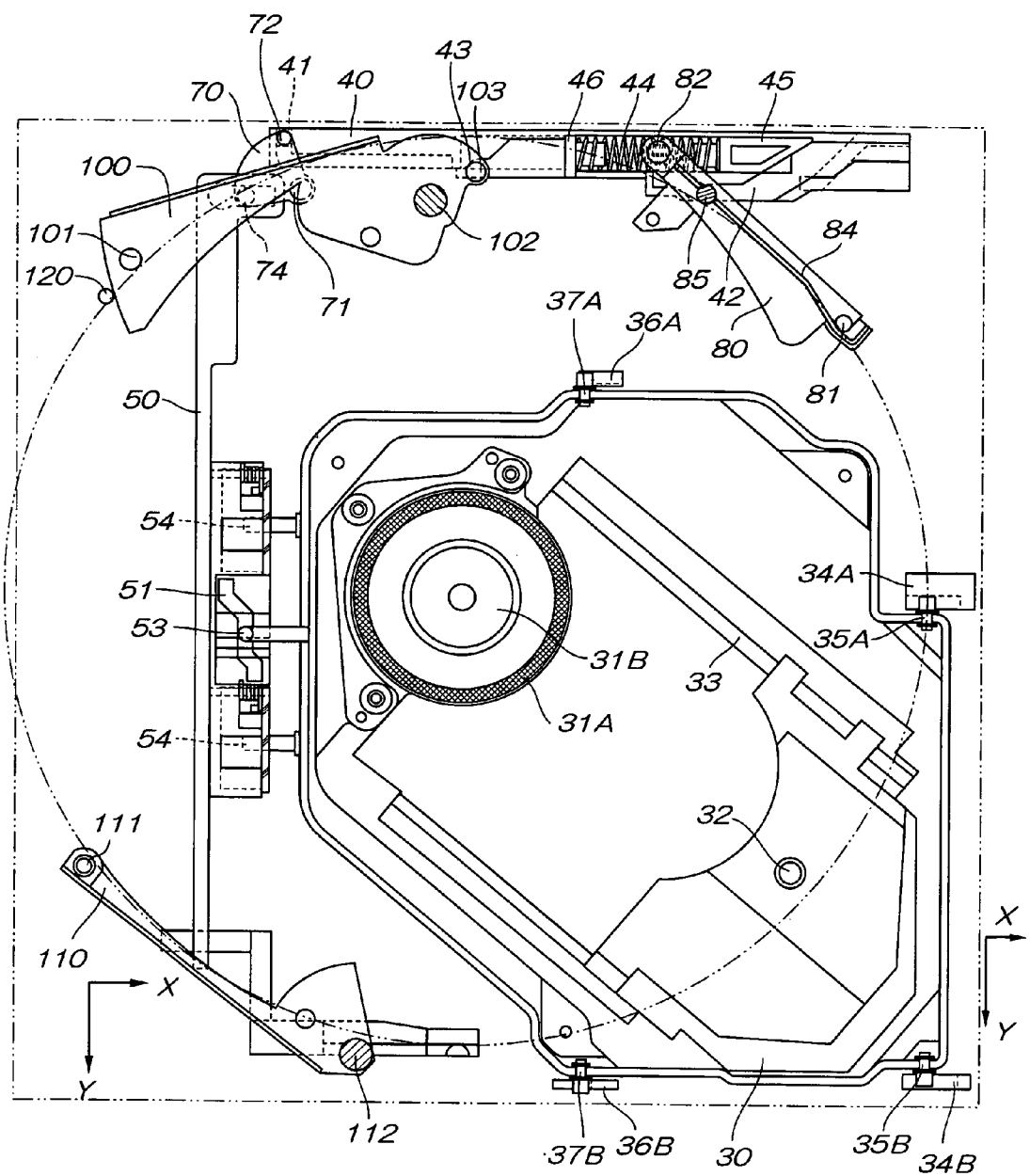
FIG. 7 is a plan view of an essential portion of the base body showing a state where a second predetermined time is elapsed after the state shown in FIG. 4.
Figure 8:
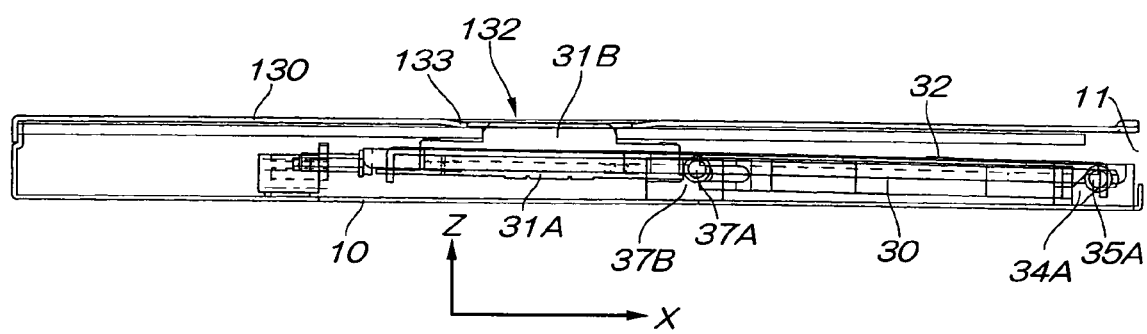
FIG. 8 is a side sectional view of an essential portion in this state.
Figure 9:
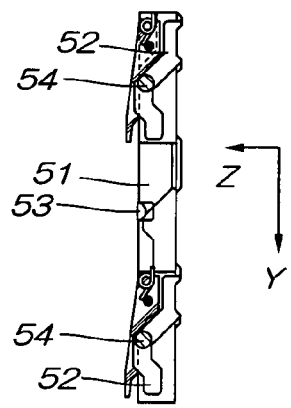
FIG. 9 is a side view of the sub-slider in this state.

FIG. 7 is a plan view of an essential portion of the base body showing a state where a second predetermined time is elapsed after the state shown in FIG. 4, FIG. 8 is a side sectional view of an essential portion in this state, and FIG. 9 is a side view of the sub-slider in this state.

Figure 10:
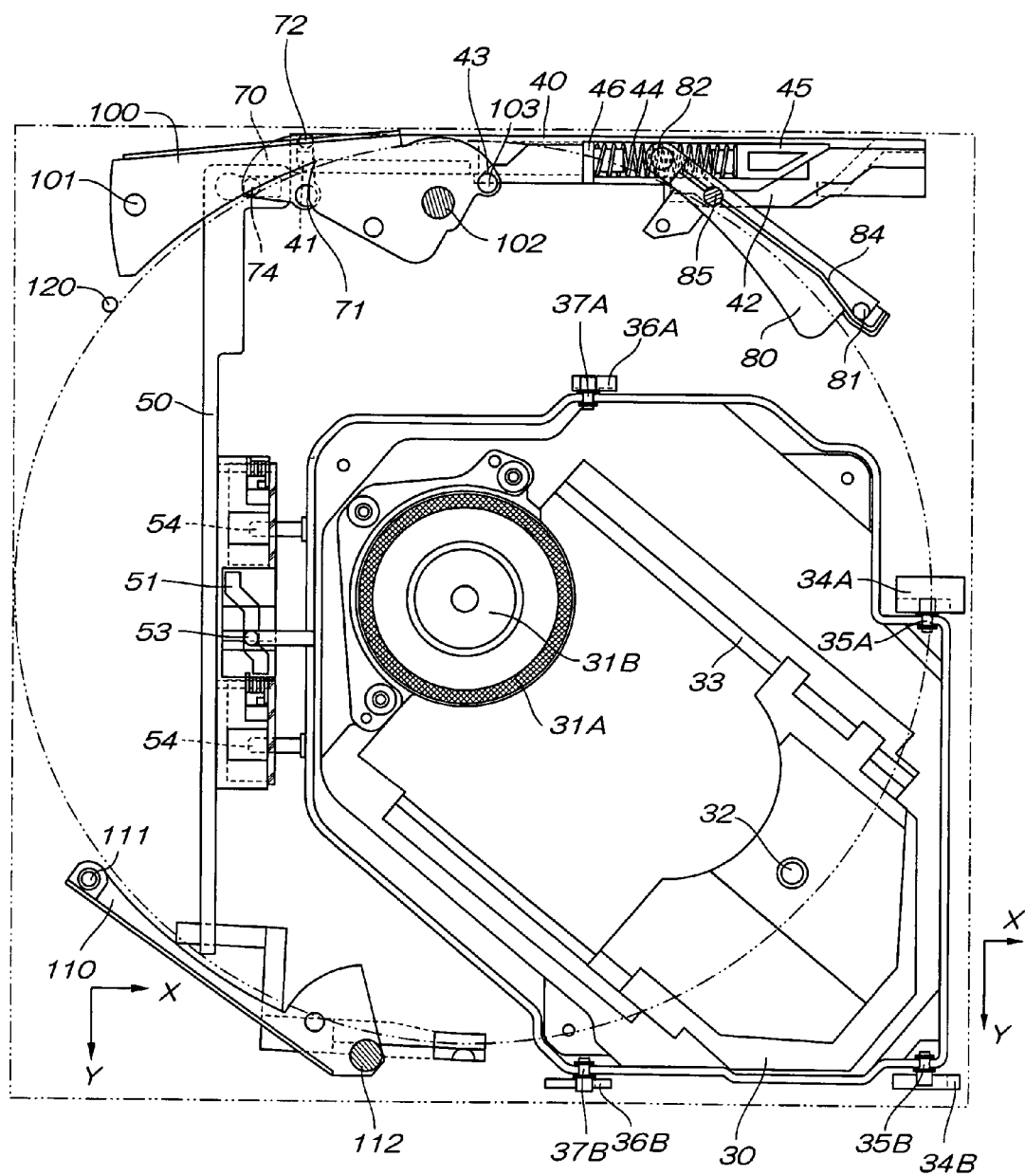
FIG. 10 is a plan view of an essential portion of the base body showing state where a third predetermined time is elapsed after the state shown in FIG. 7 and a traverse is moved to the highest position.
Figure 11:
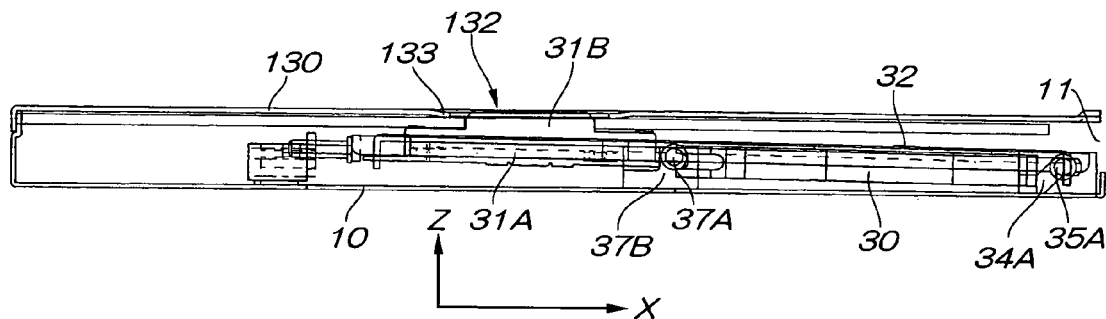
FIG. 11 is a side sectional view of an essential portion in this state.
Figure 12:
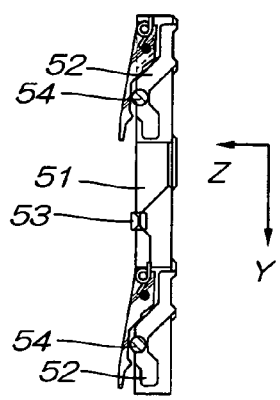
FIG. 12 is a side view of the sub-slider in this state.

FIG. 10 is a plan view of an essential portion of the base body showing a state where a third predetermined time is elapsed after the state shown in FIG. 7 and a traverse is moved to the highest position, FIG. 11 is a side sectional view of an essential portion in this state, and FIG. 12 is a side view of the sub-slider in this state.

Figure 13:
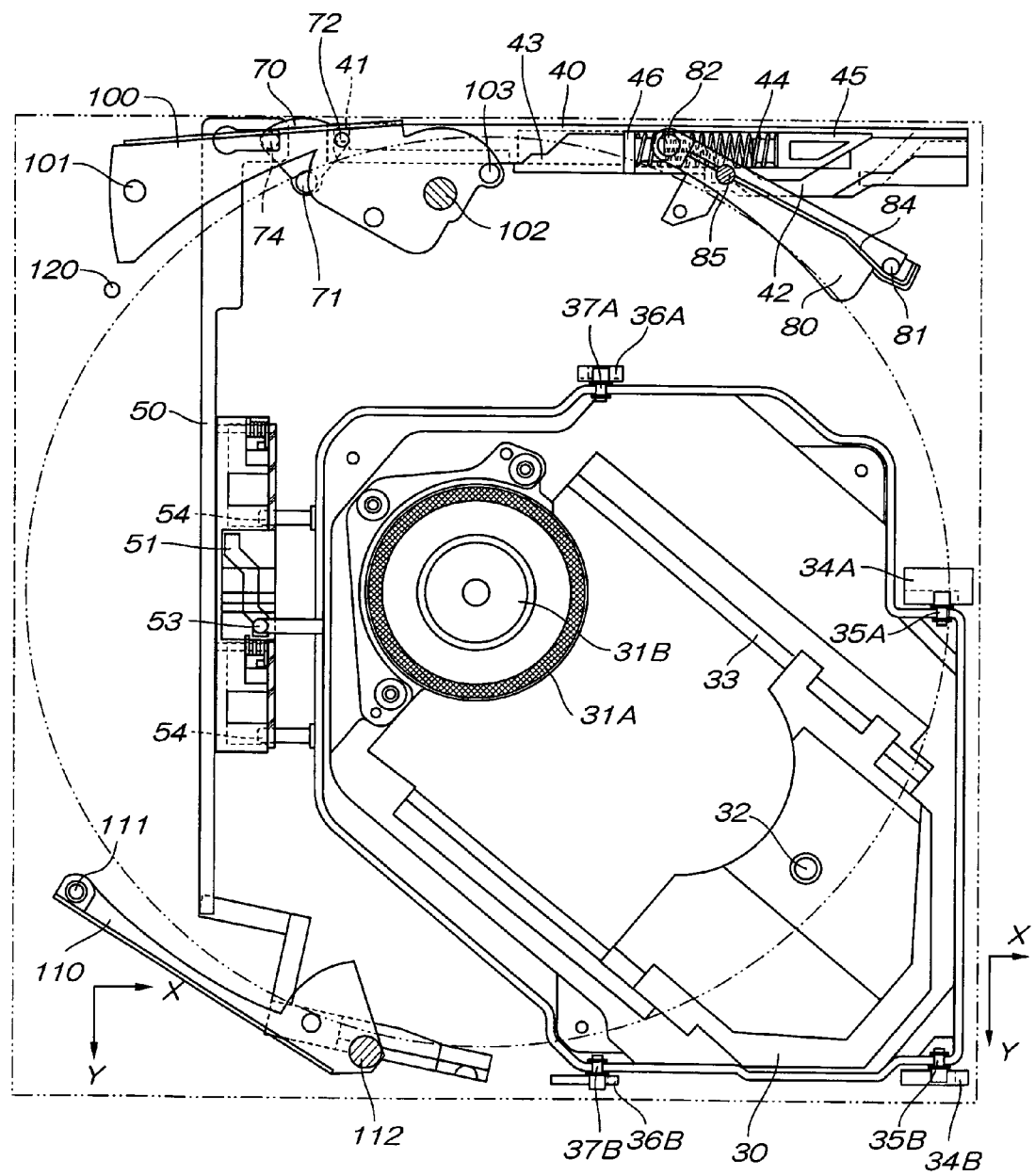
FIG. 13 is a plan view of an essential portion of the base body showing a state in which a fourth predetermined time is elapsed after the state shown in FIG. 10 and recording operation or replaying operation with respect to a disk is carried out.
Figure 14:
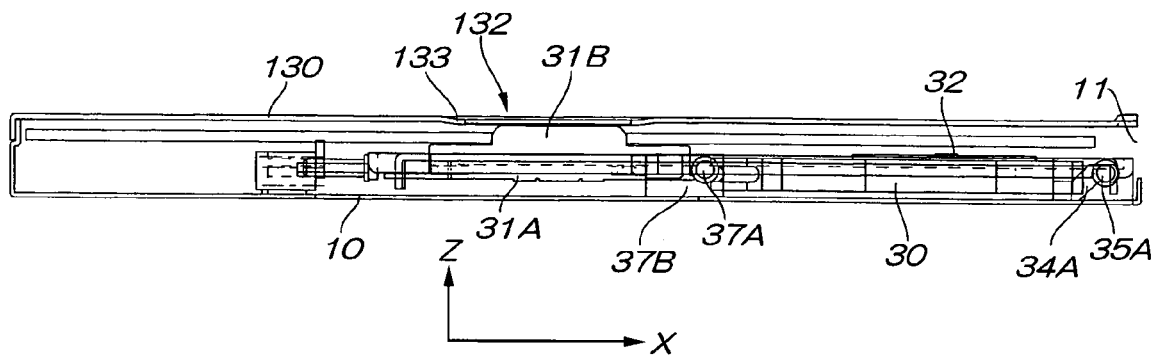
FIG. 14 is a side sectional view of an essential portion in this state.
Figure 15:
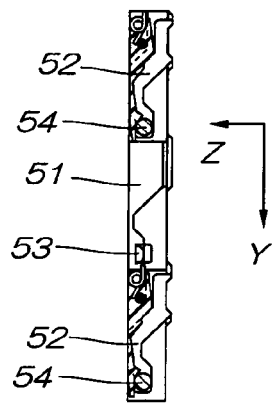
FIG. 15 is a side view of the sub-slider in this state.

FIG. 13 is a plan view of an essential portion of the base body showing a state where a fourth predetermined time is elapsed after the state shown in FIG. 10 and recording operation or replaying operation with respect to a disk is carried out, FIG. 14 is a side sectional view of an essential portion in this state, and FIG. 15 is a side view of the sub-slider in this state.

In the loading-completed state of the disk, as shown in FIGS. 1 to 3, the traverse 30 is disposed at the rearmost position closest to the base body 10.

That is, in this state, the slide pin 53 is located on one end side (the main slider 40 side) of the slider cam mechanism 51. Therefore, the traverse 30 is disposed at a position close to the rearmost side. The cam pins 35A and 35B are located on the ends of the other ends of the grooves of the fixing cams 34A and 34B. Therefore, the other end side (the pickup 32 side) of the traverse 30 is disposed at a position closest to the base body 10. The vertically moving pin 54 is located on one end side (the main slider 40 side) of the vertically moving cam mechanism 52. Therefore, the one end side (the spindle motor 31A side) of the traverse 30 is disposed at a position closest to the base body 10.

The main slider 40 moves toward the disk inserting opening 11 from the state shown in FIG. 1, and with the movement of the main slider 40, the sub-slider 50 moves toward the main slider 40.

In a state where the chucking motion is carried out for the first predetermined time, as shown in FIGS. 4 to 6, the traverse 30 moves toward the disk inserting opening 11 by the first X axis distance, and the other end of the traverse 30 is disposed at a position away from the base body 10 by the first Y axis distance.

That is, in this state, the slide pin 53 moves the slider cam mechanism 51 by the first Y axis distance, and the traverse 30 moves toward the disk inserting opening 11 by the first X axis distance. Thus, the cam pins 35A and 35B move toward the ends of one ends of the grooves of the fixing cams 34A and 34B by the first X axis distance, and the other end side (the pickup 32 side) of the traverse 30 is disposed at a position away from the base body 10 by the first Z axis distance. The vertically moving pin 54 moves from one end side (the main slider 40 side) of the vertically moving cam mechanism 52 by the first Y axis distance, but since the grooves located in the range of the first Y axis distance have the same height, the one end side (the spindle motor 31A side) of the traverse 30 is held at a position closest to the base body 10.

The main slider 40 further moves toward the disk inserting opening 11 from the state shown in FIG. 4, and with this, the sub-slider 50 further moves toward the main slider 40.

In a state where the chucking motion is further carried out for a second predetermined time from the state shown in FIG. 4, the other end of the traverse 30 is disposed at a location away from the base body 10 by a second Z axis distance (second Z axis distance>first Z axis distance) as shown in FIGS. 7 to 9.

That is, in this state, the slide pin 53 moves the slider cam mechanism 51 by the second Y axis distance, but since the groove of the slider cam mechanism 51 is provided in parallel in the moving direction (Y axis direction) of the sub-slider 50, in this moving range of the slider cam mechanism 51 the traverse 30 does not move toward the disk inserting opening 11. Therefore, the cam pins 35A and 35B do not also move in the grooves of the fixing cams 34A and 34B. The vertically moving pin 54 moves in the groove of the vertically moving cam mechanism 52 by the second Y axis distance, and moves the one end side (the spindle motor 31A side) of the traverse 30 from the base body 10 by the second Z axis distance.

If the main slider 40 further moves toward the disk inserting opening 11 from the state shown in FIG. 7, the sub-slider 50 further moves toward the main slider 40.

In a state where the chucking motion is carried out for the third predetermined time from the state shown in FIG. 7, the other end of the traverse 30 is disposed at a position of a third Z axis direction which is most separated from the base body 10 as shown in FIGS. 10 to 12.

That is, in this state, the slide pin 53 moves the slider cam mechanism 51 by a third Y axis distance, but since the groove of the slider cam mechanism 51 is provided in parallel in the moving direction (Y axis direction) of the sub-slider 50, in this moving range of the slider cam mechanism 51 the traverse 30 does not move toward the disk inserting opening 11. Therefore, the cam pins 35A and 35B do not also move in the grooves of the fixing cams 34A and 34B. The vertically moving pin 54 moves in the groove of the vertically moving cam mechanism 52 by the third Y axis distance, and moves the one end side (to the spindle motor 31A side) of the traverse 30 from the base body 10 by the third Z axis distance (highest position). In this state, the chucking of the disk by the hub 31B is completed.

If the main slider 40 further moves toward the disk inserting opening 11 from the state shown in FIG. 10, the sub-slider 50 further moves toward the main slider 40.

As shown in FIGS. 13 to 15, the traverse 30 moves toward the disk inserting opening 11, the other end of the traverse 30 moves in a direction approaching the base body 10, and is disposed at a position of the first Z axis distance.

That is, in this state, the slide pin 53 moves the slider cam mechanism 51 by a fourth Y axis direction, and the traverse 30 moves toward the disk inserting opening 11 by the second Z axis distance. Therefore, the cam pins 35A and 35B move toward the ends of the one ends of the grooves of the fixing cams 34A and 34B by the second X axis distance, but the height of the other end side (the pickup 32 side) of the traverse 30 is not varied. The vertically moving pin 54 moves in the groove of the vertically moving cam mechanism 52 by the fourth Y axis direction to move the one end (close to the spindle motor 31A) of the traverse 30 toward the base body 10, and disposes the one end at a location of the first Z axis distance.

Through the above-described motion, the disk is separated from the lid 130 and also from the fixing pin 120, and the disk is brought into a replay/recording state.

When the loaded disk is to be discharged, the loading motor is driven, the main slider 40 is moved toward its other end, and basically the above-described motion is carried out reversely.

Next, a damage-preventing mechanism of the pulling-in lever will be explained using FIGS. 16 and 17.

Figure 16:
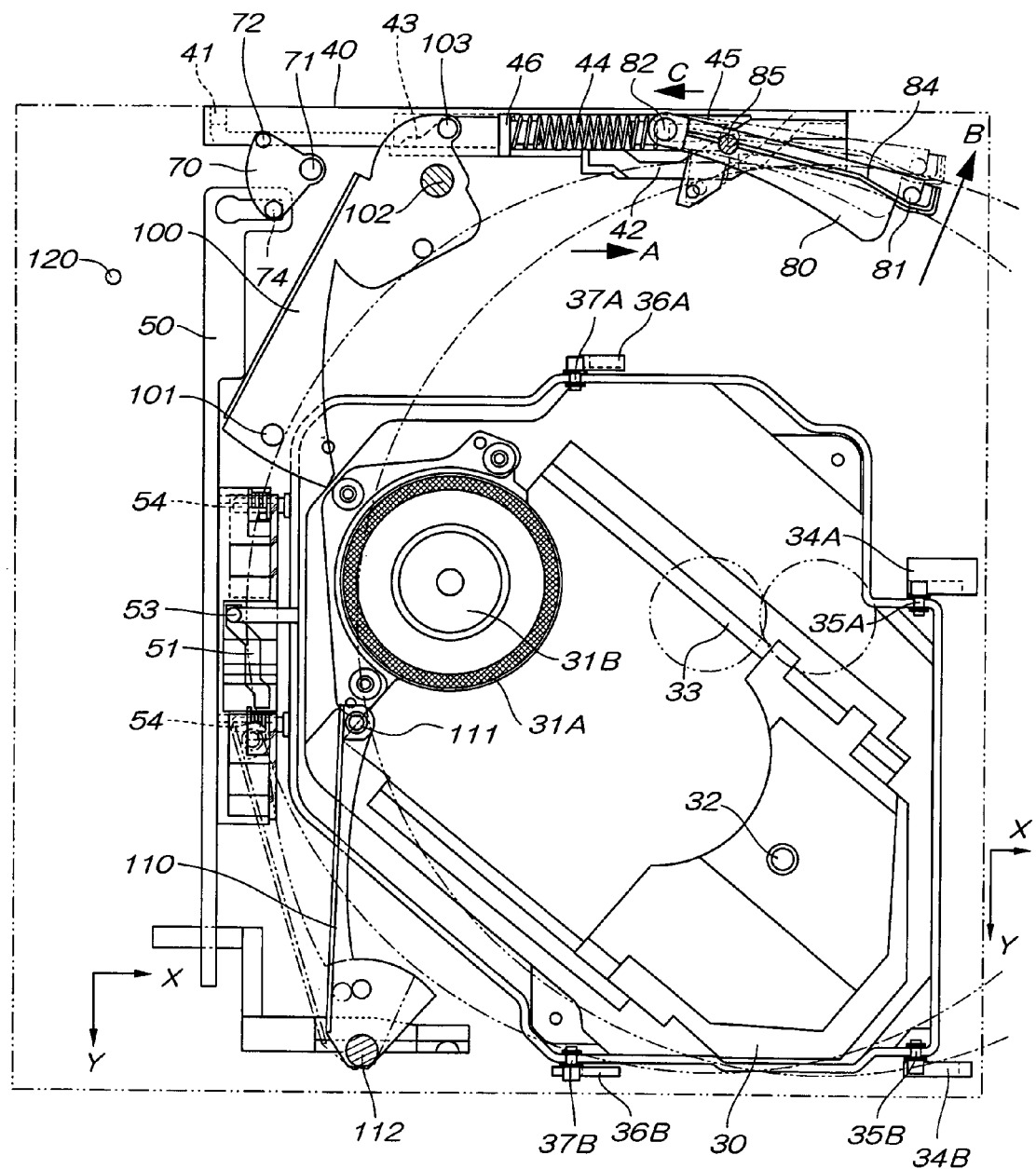
FIG. 16 is a plan view of an essential portion of the base body showing a forcibly pulling out motion of a disk in the disk apparatus.
Figure 17:
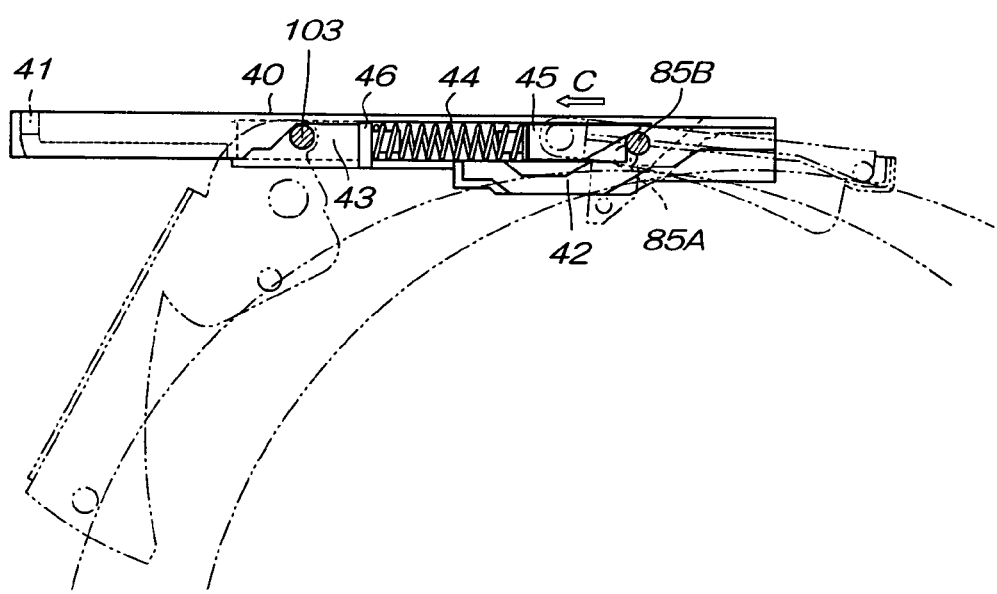
FIG. 17 is an enlarged view of an essential portion of a main slider showing this state.

FIG. 16 is a plan view of an essential portion of the base body showing a forcibly pulling out motion of a disk in the disk apparatus, and FIG. 17 is an enlarged view of an essential portion of a main slider showing this state.

In FIG. 16, if a disk is forcibly pulled out in the discharging direction (direction of arrow A), a load is applied to the pulling-in lever 80 which holds the disk. The load is applied to the pulling-in lever 80 in a direction in which the movable side end separates from the spindle motor 31A (direction of arrow B).

A displacing direction of the pin 85 in this state is shown in FIG. 17. Although the main slider 40 does not move, since the cam groove 42 in the moving direction of the pin 85A comprises the first movable piece 45, the pin 85 is displaced to a position of the pin 85B from the position of the pin 85A, and a load in a direction (direction of arrow C) in which the main slider 40 is moved toward the sub-slider 50 is applied. At that time, by the displacement toward the pin 85B, the first movable piece 45 is displaced in a direction in which the resilient member 44 is compressed. That is, the pulling-in lever 80 shown in FIG. 16 is turned in a direction (direction of arrow B) in which the movable side end separates from the spindle motor 31A. Therefore, even if a disk is forcibly pulled out in the discharging direction (direction of arrow A), the pulling-in lever 80 is not damaged.

Although the disk is forcibly pulled out in the discharging direction (direction of arrow A) in the above explanation, it is possible to prevent the pulling-in lever 80 from being damaged also when a load in a direction opposite from the inserting direction is applied when a disk is inserted.

Next, a damage-preventing mechanism of the discharging lever will be explained using FIGS. 18 and 19.

Figure 18:
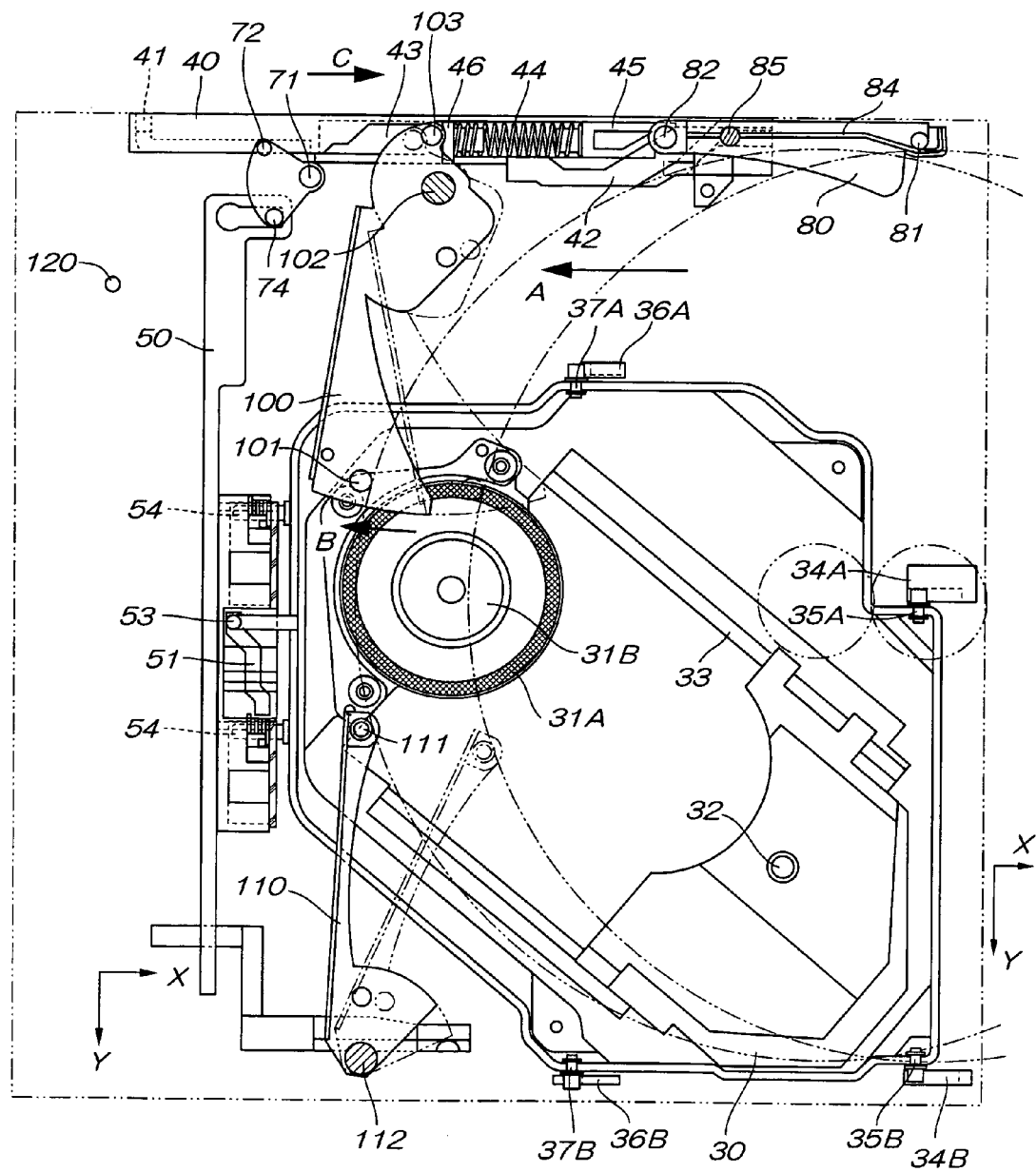
FIG. 18 is a plan view of an essential portion of the base body showing a forcibly pushing motion when a disk is ejected from the disk apparatus.
Figure 19:
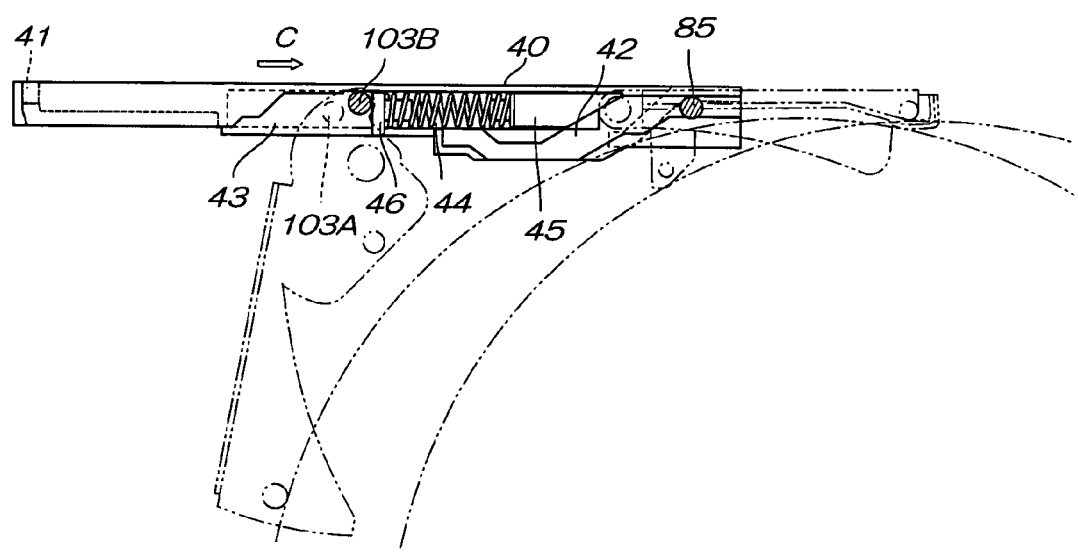
FIG. 19 is an enlarged view of an essential portion of the main slider showing this state.

FIG. 18 is a plan view of an essential portion of the base body showing a forcibly pushing motion when a disk is ejected, and FIG. 19 is an enlarged view of an essential portion of the main slider showing this state.

In FIG. 18, if a disk is forcibly pushed in a direction in which the disk is forcibly pushed (direction of arrow A), a load is applied to the discharging lever 100 which tries to discharge the disk. The load is applied to the discharging lever 100 in a direction in which the movable side end separates from the spindle motor 31A (direction of arrow B).

A displacing direction of the pin 103 in this state is shown in FIG. 19. Although the main slider 40 does not move, since the cam groove 43 in the moving direction of the pin 103A comprises the second movable piece 46, the pin 103 is displaced to a position of the pin 103B from the position of the pin 103A, and a load in a direction (direction of arrow C) in which the main slider 40 is moved toward the sub-slider 50 is applied. At that time, by the displacement toward the pin 103B, the second movable piece 46 is displaced in a direction in which the resilient member 44 is compressed. That is, the discharging lever 100 shown in FIG. 18 is turned in a direction (direction of arrow B) in which the movable side end separates from the spindle motor 31A. Therefore, even if a disk is forcibly pushed in the inserting direction (direction of arrow A), the discharging lever 100 is not damaged.

The resilient member 44 is provided at its one end with the first movable piece 45 and at its other end with the second movable piece 46 as described above. With this, it is possible to prevent both the pulling-in lever 80 and discharging lever 100 from being damaged using the single resilient member 44. Further, when a load is applied to the first movable piece 45, the pin 103 prevents the second movable piece 46 from moving, and when a load is applied to the second movable piece 46, the pin 85 prevents the first movable piece 45 from moving. Therefore, the disk apparatus can be returned to a normal operating state after abnormal state is avoided.

Next, another embodiment of the present invention will be explained using FIG. 20.

FIG. 20 are explanatory diagrams of operation showing an essential portion of the main slider.

In this embodiment, the main slider 40 is provided with a stopper 47. A rotation shaft 48 of the stopper 47 which is a turning center is disposed on the main slider 40. A cam portion 45A is constituted on the first movable piece 45. A pin 49 of the movable side end of the stopper 47 moves in the cam portion 45A. An abutting portion 47A of the stopper 47 can jump toward the side from the main slider 40, and is limited by the cam portion 45A of the movable piece 45. When the movable piece 45 is located at a normal position (when the resilient member 44 is not contracted), the abutting portion 47A of the stopper 47 does not jump toward the side (standby position), and when the movable piece 45 moves, the abutting portion 47A of the stopper 47 jumps toward the main slider 40 side (operating position). A fixing member (frame) 12 is provided on the main slider 40 side, and the stopper receiver 13 is disposed at a predetermined position. The main slider 40 moves in a state where the abutting portion 47A of the stopper 47 jumps out, and the stopper receiver 13 and the abutting portion 47A of the stopper 47 which comes to the predetermined position abut against each other so that the main slider 40 can not move.

The operation will be explained below.

Figure 20A:
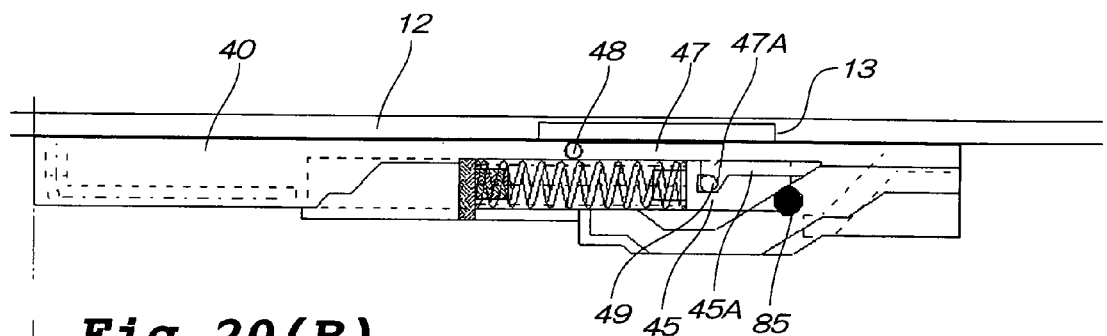
FIG. 20 are explanatory views of motion showing an essential portion of the main slider of another embodiment of the invention, wherein (A) shows a state where operation is normally carried out during a disk pulling motion, (B) shows a state where the disk forcibly pulling out operation is started by external force, and (C) shows a state where the disk forcibly pulling out operation is successively being carried out.

FIG. 20(A) shows a state where a disk is being pulled and the operation is carried out normally. The movable piece 45 is in a normal position, and the stopper 47 is disposed in a standby position by the cam portion 45A of the movable piece 45. The main slider 40 is driven by a motor and moving rightward.

Figure 20B:
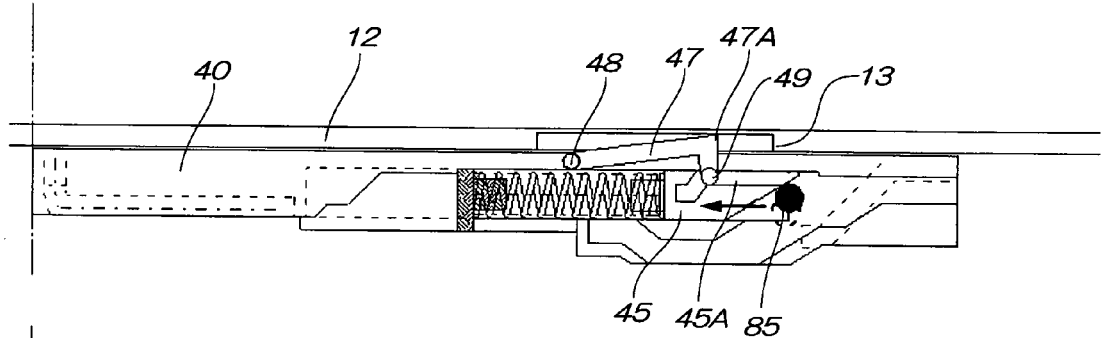

FIG. 20(B) shows a state where the forcibly pulling operation of a disk is started by external force from the former state. As shown in FIG. 20(B), the movable piece 45 moves leftward. By this movement of the movable piece 45, the pin 49 moves in the cam portion 45A, and the abutting portion 47A of the stopper 47 jumps out sideways of the main slider 40.

Figure 20C:
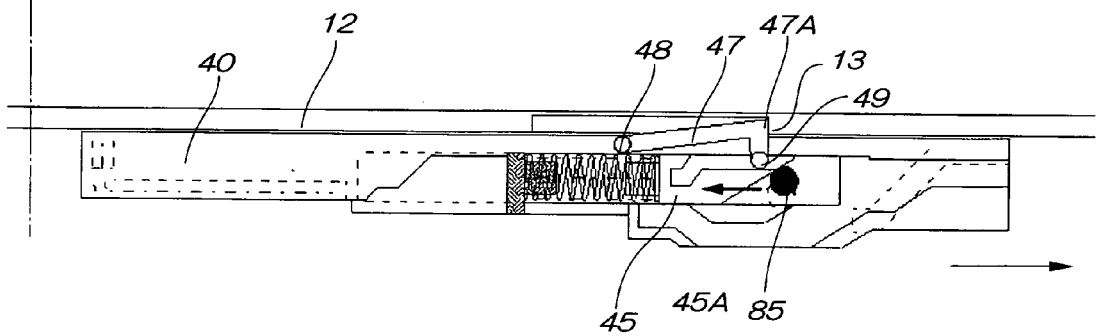

FIG. 20(C) shows a state where the forcibly pulling out operation is being successively carried out.

The main slider 40 further moves rightward by a motor from the state shown in FIG. 20(B). At that time, the cam pin 85 of the pulling-in lever 80 is forcibly pulled out by the external force and thus, the cam pin 85 is forcibly moves out (upward in the drawing). Therefore, the movable piece 45 can not move with respect to the drive unit. That is, since the main slider 40 moves rightward, the movable piece 45 relatively moves leftward with respect to the main slider 40. Here, if there exists no stopper 47, the motor successively operates and the main slider 40 further moves rightward as viewed in the drawing. In the embodiment, however, if the main slider 40 moves to the position shown in FIG. 20(C), the abutting portion 47A of the stopper 47 and the stopper receiver 13 abut against each other and the main slider 40 is stopped.

When the loading motion can not be stopped halfway through the operation, the traverse 30 rises by the further movement of the main slider 40, the main slider 40 moves, and the operation is adversely carried out up to the position where the loading operation is completed. Therefore, the loading operation is finished in a state where a disk is not actually pulled in. Thus, the disk is slightly forcibly pulled out, and if the disk is located on the hub 31B of the traverse 30, the disk recording surface may be damaged when the traverse 30 rises in some cases. Thus, according to this embodiment, it is possible to stop the loading operation halfway through the operation, and to prevent a disk from being damaged.

INDUSTRIAL APPLICABILITY

The disk apparatus of the embodiment is especially effective as a disk apparatus which is incorporated or integrally provided in a so-called notebook personal computer in which display means, input means, processing means and the like are integrally provided.

The invention claimed is:

1. A disk apparatus comprising a chassis outer sheath having a base body and a lid, in which
a front surface of said chassis outer sheath is formed with a disk inserting opening into which a disk is directly inserted, a spindle motor and a pickup are held by a traverse provided on said base body,
a slider mechanism is disposed on one end of said traverse,
said base body is rotatably provided with a pulling-in lever which inserts said disk and with a discharging lever which discharges said disk,
said slider mechanism is provided with a first cam groove in which a first pin of said pulling-in lever slides and with a second cam groove in which a second pin of said discharging lever slides,
said pulling-in lever is turned by sliding motion of said first pin in said first cam groove as said slider mechanism is operated, and said discharging lever is turned by sliding motion of said second pin in said second cam groove as said slider mechanism is operated, wherein
said slider mechanism includes a resilient member which expands and contracts in the sliding direction of said slider mechanism, a first movable piece provided on one end of said resilient member, and a second movable piece provided on the other end of said resilient member, said first movable piece constitutes a portion of said first cam groove, and second movable piece constitutes a portion of said second cam groove.

2. The disk apparatus according to claim 1, wherein said first pin displaces said first movable piece by a load applied to said pulling-in lever from said disk, and said second pin displaces said second movable piece by a load applied to said discharging lever from said disk.

3. The disk apparatus according to claim 2, wherein when said first pin displaces said first movable piece, the displacement of said second movable piece is limited by said second pin, and when said second pin displaces said second movable piece, the displacement of said first movable piece is limited by said first pin.

4. The disk apparatus according to claim 1, further comprising a stopper mechanism which stops movement of said slider mechanism at a predetermined position by displacement of said first or second movable piece with respect to a slider.

5. The disk apparatus according to claim 4, wherein said slider is provided with a stopper which moves from a standby position to an operation position by displacement of said first movable piece corresponding to said pulling-in lever with respect to said slider, said stopper which moves to the operation position abuts against a stopper receiver which is provided on a predetermined position of a fixing portion, and said slider stops at a predetermined position.

6. The disk apparatus according to claim 4, wherein said slider is provided with a stopper which moves from a standby position to an operation position by displacement of said second movable piece corresponding to said discharging lever with respect to said slider, said stopper which moves to the operation position abuts against a stopper receiver which is provided on a predetermined position of a fixing portion, and said slider stops at a predetermined position.

7. The disk apparatus according to claim 4, wherein said slider stops at a position where said traverse has not yet risen, by displacement of said first movable piece corresponding to said pulling-in lever with respect to said slider.

8. The disk apparatus according to claim 1, wherein said resilient member comprises a compression coil spring.

9. A disk apparatus in which a base body is provided with a pulling-in lever which inserts a disk, a discharging lever which discharges said disk and a slider mechanism which turns said pulling-in lever and said discharging lever,
said slider mechanism is provided with a first cam groove in which a first pin of said pulling-in lever slides and with a second cam groove in which a second pin of said discharging lever slides, said pulling-in lever is turned by sliding motion of said first pin in said first cam groove as said slider mechanism is operated, and said discharging lever is turned by sliding motion of said second pin in said second cam groove as said slider mechanism is operated, wherein said slider mechanism includes a resilient member which expands and contracts in the sliding direction of said slider mechanism, a first movable piece provided on one end of said resilient member, and a second movable piece provided on the other end of said resilient member, said first pin displaces said first movable piece by a load applied to said pulling-in lever from said disk, and said second pin displaces said second movable piece by a load applied to said discharging lever from said disk.

10. The disk apparatus according to claim 9, wherein when said first pin displaces said first movable piece, the displacement of said second movable piece is limited by said second pin, and when said second pin displaces said second movable piece, the displacement of said first movable piece is limited by said first pin.

11. The disk apparatus according to claim 9, further comprising a stopper mechanism which stops movement of said slider mechanism at a predetermined position by displacement of said first or second movable piece with respect to a slider.

12. The disk apparatus according to claim 9, wherein said slider is provided with a stopper which moves from a standby position to an operation position by displacement of said first movable piece corresponding to said pulling-in lever with respect to said slider, said stopper which moves to the operation position abuts against a stopper receiver which is provided on a predetermined position of a fixing portion, and said slider stops at a predetermined position.

13. The disk apparatus according to claim 9, wherein said slider is provided with a stopper which moves from a standby position to an operation position by displacement of said second movable piece corresponding to said discharging lever with respect to said slider, said stopper which moves to the operation position abuts against a stopper receiver which is provided on a predetermined position of a fixing portion, and said slider stops at a predetermined position.

14. A disk apparatus in which a base body is provided with a pulling-in lever which inserts a disk and a slider mechanism which turns said pulling-in lever, said slider mechanism is provided with a cam groove in which a pin of said pulling-in lever slides, said pulling-in lever is turned by sliding motion of said pin in said cam groove as said slider mechanism is operated, wherein said slider mechanism includes a resilient member which expands and contracts in the sliding direction of said slider mechanism, and a movable piece provided on one end of said resilient member, said movable piece constitutes a portion of said cam groove, and said pin displaces said movable piece by a load applied to said pulling-in lever from said disk.

15. The disk apparatus according to claim 14, further comprising a stopper mechanism which stops movement of said slider mechanism at a predetermined position by displacement of said first or second movable piece with respect to a slider.

16. The disk apparatus according to claim 14, wherein said slider is provided with a stopper which moves from a standby position to an operation position by displacement of said first movable piece corresponding to said pulling-in lever with respect to said slider, said stopper which moves to the operation position abuts against a stopper receiver which is provided on a predetermined position of a fixing portion, and said slider stops at a predetermined position.

17. The disk apparatus according to claim 14, wherein said slider is provided with a stopper which moves from a standby position to an operation position by displacement of said second movable piece corresponding to said discharging lever with respect to said slider, said stopper which moves to the operation position abuts against a stopper receiver which is provided on a predetermined position of a fixing portion, and said slider stops at a predetermined position.

18. A disk apparatus in which a base body is provided with a discharging lever which discharges a disk and a slider mechanism which turns said discharging lever, said slider mechanism provides with a cam groove in which a pin of said discharging lever slides, said discharging lever is turned by sliding motion of said pin in said cam groove as said slider mechanism is operated, wherein said slider mechanism includes a resilient member which expands and contracts in a sliding direction of said slider mechanism, and a movable piece provided on one end of said resilient member, said movable piece constitutes a portion of said cam groove, and said pin displaces said movable piece by a load applied to said discharging lever from said disk.

19. The disk apparatus according to claim 18, further comprising a stopper mechanism which stops movement of said slider mechanism at a predetermined position by displacement of said first or second movable piece with respect to a slider.

20. The disk apparatus according to claim 18, wherein said slider is provided with a stopper which moves from a standby position to an operation position by displacement of said first movable piece corresponding to said pulling-in lever with respect to said slider, said stopper which moves to the operation position abuts against a stopper receiver which is provided on a predetermined position of a fixing portion, and said slider stops at a predetermined position.

21. The disk apparatus according to claim 18, wherein said slider stops at a position where said traverse has not yet risen, by displacement of said first movable piece corresponding to said pulling-in lever with respect to said slider.

* * * * *